Jan. 15, 1929.　　　　　　　　　　　　　　　　　　　1,699,175
C. G. YARN
CLEAN OUT SYSTEM FOR DAIRY BARNS AND THE LIKE
Filed March 28, 1927　　　2 Sheets-Sheet 1
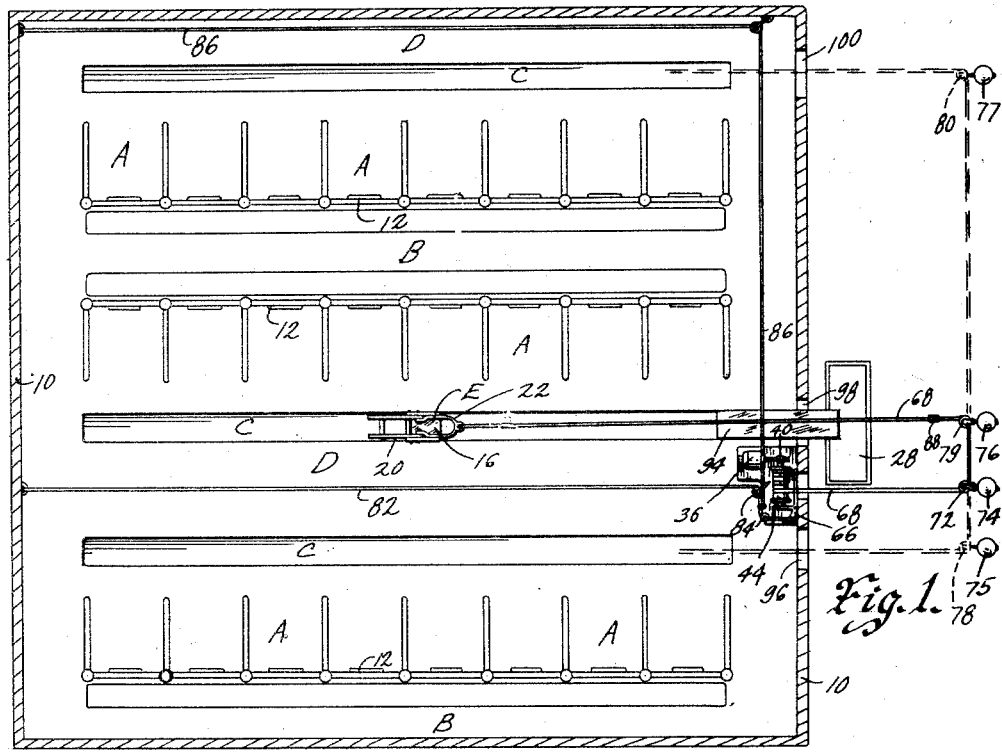
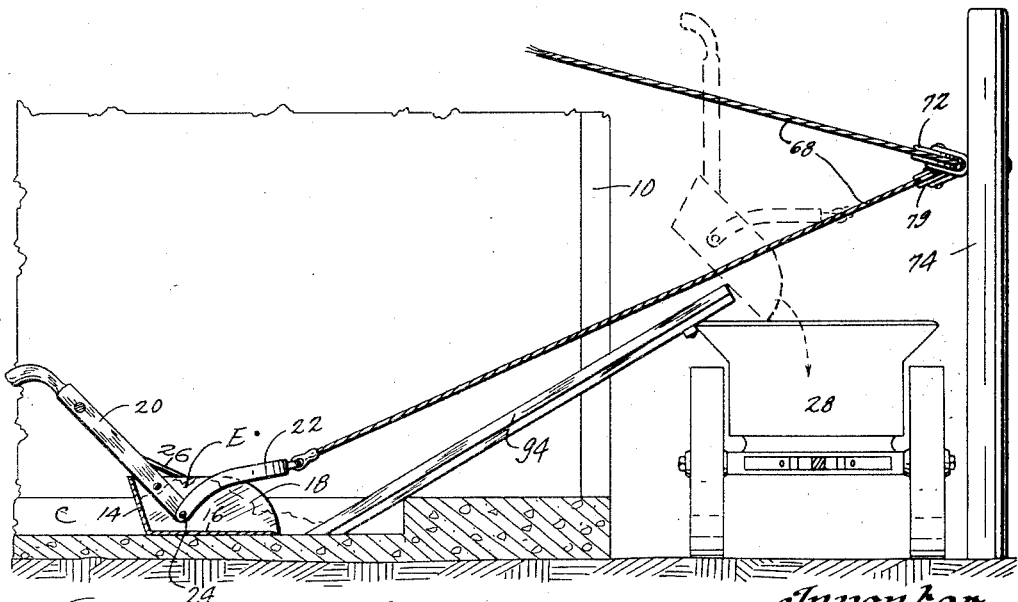
Fig. 2.
Witness
Ray Kinsley
Inventor
Clarence G. Yarn
by Bair & Freeman Attorneys Jan. 15, 1929.  1,699,175
C. G. YARN
CLEAN OUT SYSTEM FOR DAIRY BARNS AND THE LIKE
Filed March 28, 1927   2 Sheets-Sheet 2

Inventor
Clarence G. Yarn
by Bair & Freeman Attorneys

Witness

Patented Jan. 15, 1929.

1,699,175

UNITED STATES PATENT OFFICE.

CLARENCE G. YARN, OF DES MOINES, IOWA.

CLEAN-OUT SYSTEM FOR DAIRY BARNS AND THE LIKE.

Application filed March 28, 1927. Serial No. 179,171.

The object of my invention is to provide for dairy barns and the like a clean out system of simple, inexpensive and efficient construction, whereby a great amount of time and labor may be saved.

In carrying out this general object it is my purpose in particular to provide a means whereby the litter troughs or the like used for manure in dairy barns may be quickly and conveniently and easily cleaned by using a simple mechanism peculiarly adapted for dragging a specially made litter slip along the litter troughs.

With these and other objects in view, my invention consists in the construction, arrangement and combination of the various parts of my clean out system, whereby the objects contemplated are attained, as hereinafter more fully set forth, pointed out in my claims, and illustrated in the accompanying drawings, in which:

Figure 1 is a plan view of my system arranged in a barn, the walls of which are shown in horizontal section.

Figure 2 is a detail, sectional view taken on the line of one side of one of the litter troughs, showing one form of chute.

Figure 3:
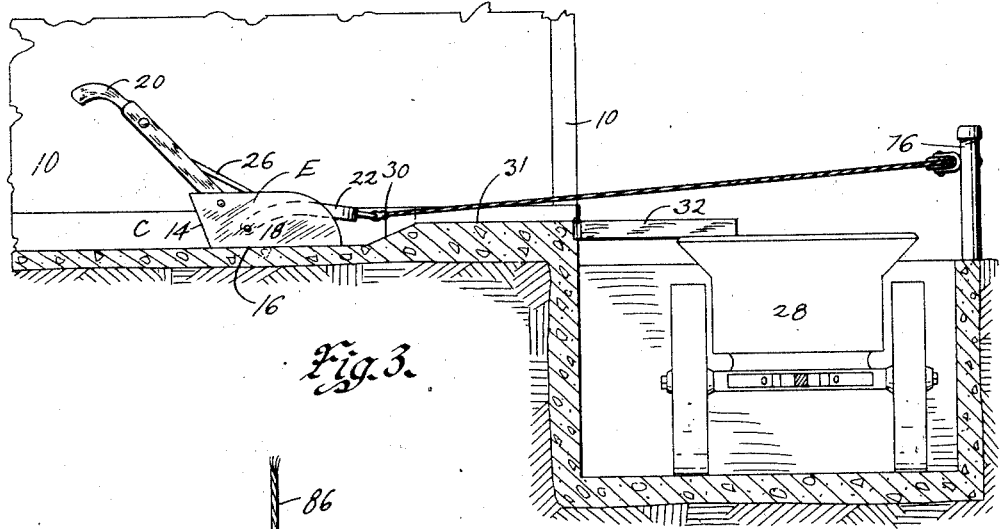
Figure 3 is a detail, sectional view taken on the same showing another form of chute.
Figure 4:
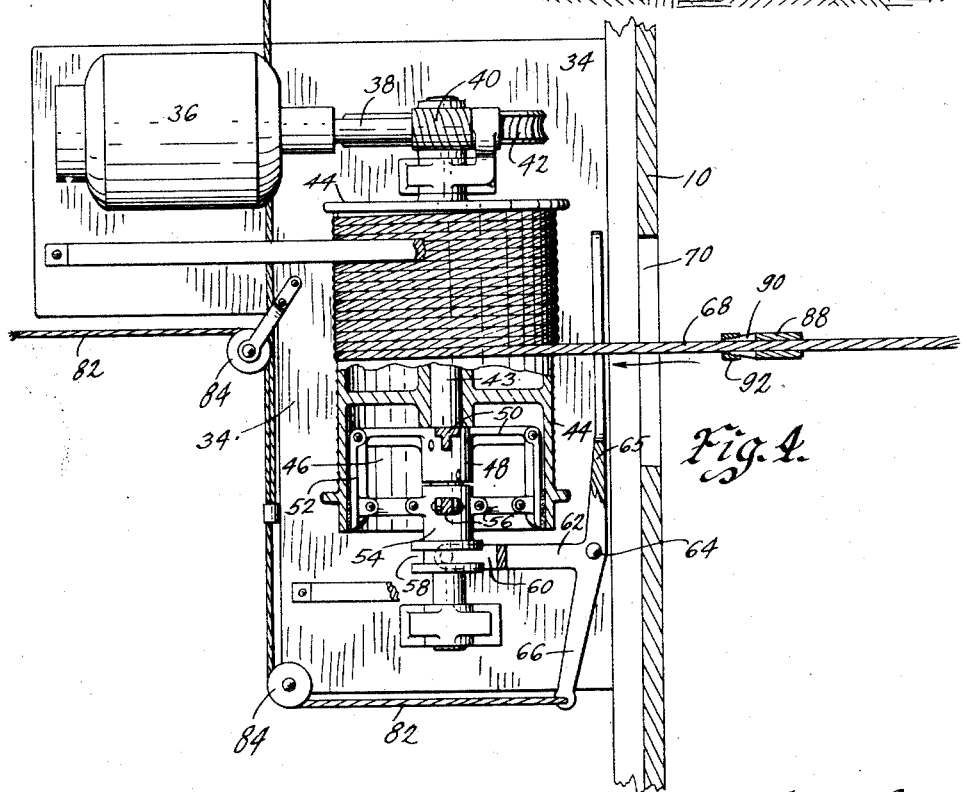
Figure 4 is a plan view of the motor and drum structure, the brake mechanism being shown in horizontal section.

In the accompanying drawings, I have used the reference numeral 10 to indicate generally the walls of a barn, such as is used for dairying purposes.

In the barn, there may be the cow stalls A with the stanchions 12, shown diagrammatically, feed alleys B, the litter troughs C, and the litter alleys D.

Ordinarily, the preferred arrangement is one in which the litter alley D is arranged between two litter troughs C. The floors are preferably made of concrete and the litter troughs C are simply formed therein.

In dairy barns, where the cattle are kept in the barn and fed, the problem of removing the litter is one of considerable importance involving a great amount of rather unpleasant labor and a substantial amount of time. A cart or wagon may be drawn along the litter alleys and the litter from the trough thrown into the cart. This is a slow, hard, heavy job.

In many barns, a litter carrier is used. This travels above the litter alley. The litter must be thrown from the trough C into the litter carrier. The litter is thus entirely handled by hand, and a considerable amount of work is required for cleaning the alley after the litter carrier has been used there to the great amount of spillage of litter and water.

Where my system is employed, I use a litter slip indicated generally at E in Figures 1, 2 and 3, having a slightly inclined rear wall 14, a bottom 16 and side walls 18.

Secured to the side walls 18 are rearwardly projecting handles 20. A yoke 22 has its arms received between the side walls 18 and pivoted thereto as at 24 near the lower portions of the side walls near their rear ends, preferably by the same rivets or bolts, which secure the lower ends of the handles 20. The handles 20 may be braced with relation to the side walls 18 by braces 26.

The litter slip is made of such a size as to travel readily in the trough C for cleaning out the trough.

I provide means whereby the slip E may be pulled along the trough for pulling the litter therein to the end of the trough. At the end of the trough, there may be a manure pit F into which a wagon 28 may be driven.

Where a pit F is provided or a corresponding drive is provided low enough for the purpose, I provide at the discharge end of the trough C an inclined wall 30, beyond which is a floor portion 31, which is used for ordinary work around the barn.

A hinged or removable chute 32 may be provided as shown in Figure 2 and swung to level position for discharging into the wagon 28.

For dragging the litter slip E, I provide a suitably mounted support or bracket 34 on which may be mounted a source of power, such for example as the motor 36. A motor shaft 38 is preferably provided with a worm 40 arranged in mesh with a worm wheel 42 on the shaft 43. Loosely mounted on the shaft 43 is a drum 44. One end of the drum is provided with the cylindrical recess 46.

Fixed to the shaft 43 preferably within the recess 46 is a sleeve 48 from which projects opposite radial arms 50. Pivoted to the arms 50 are the shoes 52 adapted to coact with the interior of the wall of the drum 44 within the recess 46 for serving as a clutch.

Slidably mounted on the shaft 43 is a sleeve 54. Links 56 are pivoted to the sleeve 54 and to the shoes 52. The sleeve 54 is provided with an annular groove 58 to receive the fingers of the bifurcated end 60 of a clutch actuating lever 62 pivoted at 64 and having oppositely extended arms 65 and 66.

By adjusting the lever 62, the shoes 52 can be moved into and out of clutching engagement.

Wound on the drum 44 is a cable 68. The cable 68 extends through a hole 70 in the wall of the barn 10 and around a suitably mounted pulley 72 hung on a post 74 or other suitable support. Posts 75, 76 and 77 support similar pulleys 78, 79 and 80. These various posts are in line with the several litter troughs in the barn.

Assuming that it is desired to clean out the trough C in which the litter slip E is shown in Figure 1, the cable 68 is adjusted around the pulleys 72 and 79 on the posts 74 and 76 as shown in Figure 1. The litter slip E is adjusted in the trough C at a proper distance from the end thereof.

A little experience will readily show about how large a load the litter slip will carry and push at one time. My experience shows that it will carry over half a ton.

For controlling the lever 62 from any point along the litter alleys, I connect with the arm 66 of the lever 62 a rope or the like 82, which may be extended around suitable pulleys 84 and may be provided with branches 86.

The operator starts the motor with the clutch out of engagement and lifts the handles 20 as much as may be necessary. The operator pulls the rope 82 or the branch 86 for manipulating the lever 62 for throwing the clutch into gear.

I should have said that I provide on the cable 68 a detachable lever operating device, comprising a sleeve 88 having the split end 90 on which may be screwed a cap 92 for causing the members to grip the split end of the cable. This stop device is fixed on the rope at such a point that when the slip E has traveled almost to the end of the chute 32, the stop device will engage the end 65ª of the lever 62 and actuate the lever for throwing the clutch out of gear.

The operator then dumps the load into the wagon 28 and turns and cleans out a further section or length of the trough C.

If it is desired to clean out the trough C shown at the upper part of Figure 1, the cable is adjusted around the pulley 80 on the post 77 and the slip is placed in the proper trough C.

For purposes of illustrating the variety of adjustments and arrangements, which may be made with my system, I have shown connected with the trough C at the upper part of Figure 1 a longer chute 94 up which the slip may be drawn for dumping the litter into the wagon 28 standing on the ground substantially on the level with the barn floor. This chute, of course, is removable.

It will readily be seen that by proper adjustment of the cable, the trough C at the lower part of Figure 1 may be similarly cleaned.

One feature of structure which is involved in the use of my system is found in the arrangement of the doors 96, 98 and 100 of the barn adjacent to and in line with the respective troughs C. This is a feature of construction, which has never heretofore been used in structures of this kind.

It will, of course, be understood that a great many changes may be made in the details of structure and the arrangement of parts of my improved clean-out system for barns without departing from the essential spirit and purpose of my invention.

Any suitable power device and cleaning mechanism and clutch may be employed that might be desirable or convenient for the purpose. The stop device 88, of course, should be small enough to easily pass through the pulleys 72, 78, 79, and 80.

One great advantage of my system is the elimination of litter and water being spilled on the alleys D which is impossible to avoid in the litter carrier system. My alleys are therefore always dry and free of litter and consequently free of odors.

It is my intention to cover by my claims any modified forms of structure or use of mechanical equivalents, which may be reasonably included within the scope of my claims.

I claim as my invention:

1. In a system of the kind described, the combination of a floor having spaced litter troughs therein with a slip adapted to travel in said trough, a movable chute for extending from the discharge end of a trough, and means for dragging the slip along either of the troughs and chute.

2. In a system of the kind described, the combination of a floor having a spaced parallel litter troughs therein with a slip adapted to travel in either of said troughs, a movable chute adapted for connection with the discharge end of a trough, means for dragging the slip along either trough and its chute, and means for setting said first means in operation accessible anywhere along the little troughs.

3. In a system of the kind described, a barn having a wall and parallel little troughs, a wall having doors in line with the litter troughs, a movable chute adapted to be extended through a door from a trough, a slip arranged to travel in either trough and its chute, means for drawing the slip along either of said troughs, and means for automatically rendering said last-named means inoperative when the slip approaches the discharge end of the chute adjustable for proper operation when either trough is being cleaned.

4. In a structure of the class described, the combination of a building structure having a wall and a plurality of litter troughs, doors in said walls in line with the respective little troughs, a slip adapted to travel in either litter trough, posts in line with the respective doors and troughs, means for drawing said slip along either litter trough, including a cable, and means for mounting the cable selectively on either post.

Des Moines, Iowa, March 12, 1927.

CLARENCE G. YARN.